(12) United States Patent
Bisley et al.

(10) Patent No.: US 7,505,360 B2
(45) Date of Patent: Mar. 17, 2009

(54) FAST 3-D SURFACE MULTIPLE PREDICTION

(75) Inventors: Richard Bisley, Mt Lawley (AU); Ian Moore, Trigg (AU)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 10/599,395

(22) PCT Filed: Jul. 16, 2004

(86) PCT No.: PCT/US2004/023120

§ 371 (c)(1),
(2), (4) Date: Jul. 5, 2007

(87) PCT Pub. No.: WO2005/103765

PCT Pub. Date: Nov. 3, 2005

(65) Prior Publication Data

US 2007/0274153 A1   Nov. 29, 2007

Related U.S. Application Data (60) Provisional application No. 60/560,223, filed on Apr. 7, 2004.

(51) Int. Cl.
  *G01V 1/36* (2006.01)
  *G01V 1/38* (2006.01)
(52) U.S. Cl. .............. 367/24; 367/50; 367/52; 367/53
(58) Field of Classification Search ............ 367/24, 367/50–53
  See application file for complete search history.

(56) References Cited

U.S. PATENT DOCUMENTS 6,021,379 A * 2/2000 Duren et al. ............... 702/16
6,480,440 B2 * 11/2002 Douma et al. ............. 367/21
6,636,810 B1 * 10/2003 Moore et al. ............. 702/17
6,832,161 B1 * 12/2004 Moore ..................... 702/17
7,181,347 B2 * 2/2007 Moore ..................... 702/14
7,257,492 B2 * 8/2007 Moore ..................... 702/17

(Continued)

FOREIGN PATENT DOCUMENTS

GB    2429527 A  *  2/2007

OTHER PUBLICATIONS

Reshef et al. 3D Prediction of surface-related and interbed multiples. Geophysics. vol. 71. No. 1 (Jan.-Feb. 2006).*

(Continued)

*Primary Examiner*—Jack W. Keith
*Assistant Examiner*—Scott A Hughes
(74) *Attorney, Agent, or Firm*—Ari Pramudji; Liangang (Mark) Ye; Jeffrey Griffin (57) ABSTRACT

A method and apparatus for predicting a plurality of surface multiples for a plurality of traces in a record of seismic data. In one embodiment, the method includes providing a plurality of target traces at a nominal offset and a nominal azimuth; selecting a plurality of pairs of input traces, wherein the midpoints of the input traces in each pair are separated by half the nominal offset and the azimuth of a line connecting the midpoints of the input traces in each pair is equal to the nominal azimuth; convolving the selected pairs of input traces to generate a plurality of convolutions; and applying a three dimensional operator to the convolutions.

23 Claims, 5 Drawing Sheets

U.S. PATENT DOCUMENTS

| | | | |
|---|---|---|---|
| 2005/0065758 A1* | 3/2005 | Moore | 703/10 |
| 2005/0088913 A1* | 4/2005 | Lecomte | 367/51 |
| 2006/0098529 A1* | 5/2006 | Anderson et al. | 367/38 |
| 2006/0155477 A1* | 7/2006 | Matson et al. | 702/14 |
| 2006/0190181 A1* | 8/2006 | Deffenbaugh et al. | 702/14 |
| 2006/0203613 A1* | 9/2006 | Thomsen et al. | 367/38 |
| 2006/0247860 A1* | 11/2006 | Angerer et al. | 702/14 |
| 2006/0250892 A1* | 11/2006 | Siliqi et al. | 367/52 |
| 2007/0032954 A1* | 2/2007 | Moore et al. | 702/5 |
| 2007/0064530 A1* | 3/2007 | Moore | 367/38 |
| 2007/0268780 A1* | 11/2007 | Moore | 367/21 |

OTHER PUBLICATIONS

Hardy, P. Improved RMO Picking and Velocity Model Building with Prestack Skeletons. 77th Annual SEG International Meeting (San Antonia, TX Sep. 23-28, 2007). Abstract Only.*

Levin, "Prestack poststack 3D multiple prediction," $72^{nd}$ *SEG Ann. Mtg.*, Salt Lake City, Utah, pp. 2110-2113, Oct. 6-11, 2002.

* cited by examiner

FAST 3-D SURFACE MULTIPLE PREDICTION

CROSS-REFERENCE TO RELATED APPLICATIONS

This application claims benefit of U.S. provisional patent application Ser. No. 60/560,223, filed Apr. 7, 2004, which is herein incorporated by reference.

BACKGROUND OF THE INVENTION

1. Field of the Invention

Embodiments of the present invention generally relate to marine seismic surveying and, more particularly, to a method for attenuating the effect of surface multiples in seismic signals.

2. Description of Related Art

Seismic surveying is a method for determining the structure of subterranean formations in the earth. Seismic surveying typically utilizes seismic energy sources which generate seismic waves and seismic receivers which detect seismic waves. The seismic waves propagate into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer. The seismic receivers detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

Marine seismic surveying is a method for determining the structure of subterranean formations underlying bodies of water. Marine seismic surveying typically utilizes seismic energy sources and seismic receivers located in the water which are either towed behind a vessel or positioned on the water bottom from a vessel. The energy source is typically an explosive device or compressed air system which generates seismic energy, which then propagates as seismic waves through the body of water and into the earth formations below the bottom of the water. As the seismic waves strike interfaces between subterranean formations, a portion of the seismic waves reflects back through the earth and water to the seismic receivers, to be detected, transmitted, and recorded. The seismic receivers typically used in marine seismic surveying are pressure sensors, such as hydrophones. Additionally, though, motion sensors, such as accelerometers may be used. Both the sources and receivers may be strategically repositioned to cover the survey area.

Figure 1:
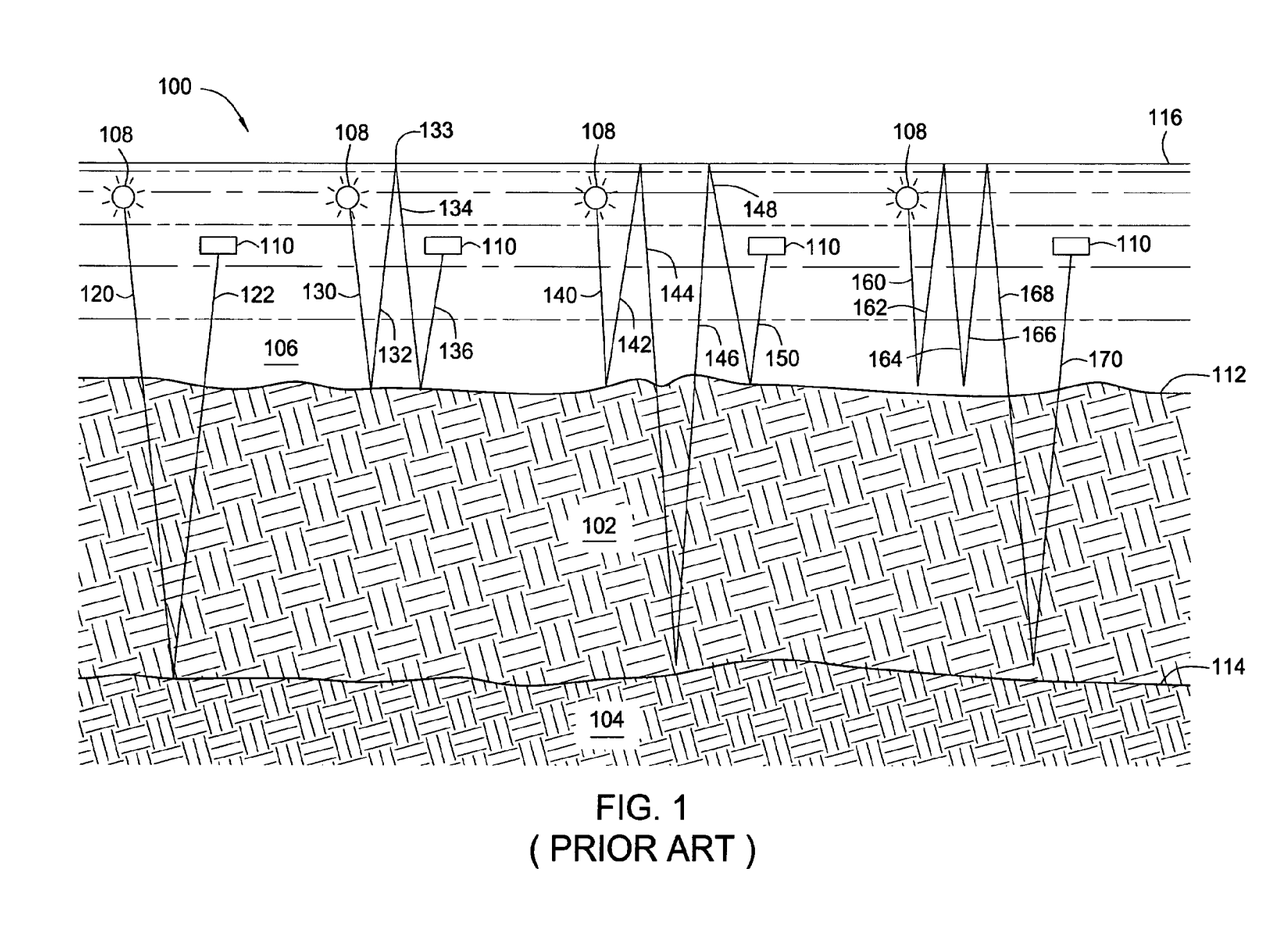
FIG. 1 illustrates a diagrammatic view of marine seismic surveying.

Seismic waves, however, reflect from interfaces other than just those between subterranean formations, as would be desired. Seismic waves also reflect from the water bottom and the water surface, and the resulting reflected waves themselves continue to reflect. Waves which reflect multiple times are called "multiples". Waves which reflect multiple times in the water layer between the water surface above and the water bottom below are called "water-bottom multiples". Water-bottom multiples have long been recognized as a problem in marine seismic processing and interpretation, so multiple attenuation methods based on the wave equation have been developed to handle water-bottom multiples. However, a larger set of multiples containing water-bottom multiples as a subset can be defined. The larger set includes multiples with upward reflections from interfaces between subterranean formations in addition to upward reflections from the water bottom. The multiples in the larger set have in common their downward reflections at the water surface and thus are called "surface multiples". FIG. 1, discussed below, provides examples of different types of reflections.

FIG. 1 shows a diagrammatic view of marine seismic surveying. The procedure is designated generally as 100. Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the water toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between two subterranean formations, such as interface 114 between formations 102 and 104. When the reflected waves traveling upward reach the water/air interface at the water surface 116, a majority portion of the waves reflects downward again. Continuing in this fashion, seismic waves can reflect multiple times between upward reflectors, such as the water bottom 112 or formation interfaces below, and the downward reflector at the water surface 116 above, as described more fully below. Each time the reflected waves propagate past the position of a seismic receiver 110, the receiver 110 senses the reflected waves and generates representative signals.

Primary reflections are those seismic waves which have reflected only once, from the water bottom 112 or an interface between subterranean formations, before being detected by a seismic receiver 110. An example of a primary reflection is shown in FIG. 1 by raypaths 120 and 122. Primary reflections contain the desired information about the subterranean formations which is the goal of marine seismic surveying. Surface multiples are those waves which have reflected multiple times between the water surface 116 and any upward reflectors, such as the water bottom 112 or formation interfaces, before being sensed by a receiver 110. An example of a surface multiple which is specifically a water bottom multiple is shown by raypaths 130, 132, 134 and 136. The point on the water surface 116 at which the wave is reflected downward is generally referred to as the downward reflection point 133. The surface multiple starting at raypath 130 is a multiple of order one, since the multiple contains one reflection from the water surface 116. Two examples of general surface multiples with upward reflections from both the water bottom 112 and formation interfaces are shown by raypaths 140, 142, 144, 146, 148 and 150 and by raypaths 160, 162, 164, 166, 168 and 170. Both of these latter two examples of surface multiples are multiples of order two, since the multiples contain two reflections from the water surface 116. In general, a surface multiple is of order i if the multiple contains i reflections from the water surface 116. Surface multiples are extraneous noise which obscures the desired primary reflection signal.

Surface multiple attenuation is a prestack inversion of a recorded wavefield which removes all orders of all surface multiples present within the marine seismic signal. Unlike some wave-equation-based multiple-attenuation algorithms, surface multiple attenuation does not require any modeling of or assumptions regarding the positions, shapes and reflection coefficients of the multiple-causing reflectors. Instead, surface multiple attenuation relies on the internal physical consistency between primary and multiple events that must exist in any properly recorded marine data set. The information needed for the surface multiple attenuation process is already contained within the seismic data.

Various prior art methods have been tried for removal of surface multiples from recorded traces. It has been noted, for example, that the travel time for a water bottom multiple is a function of the "offset", the distance between the source and receiver, and the number of times the multiple reflects from the surface. For example, if the multiple reflects from the surface once before being received by the microphone and the offset is zero, the multiple's travel time is exactly twice that of the principal waves. This fact has been used in various schemes to remove multiples.

Other methods involve complex ray tracing schemes which generate a synthetic multiple wave and subtract it from the actual wave to obtain a supposedly multiple free record. However, these methods are very awkward in that they require significant knowledge of the subsea structure as well as the ocean bottom configuration before the synthetic wave can be generated. Similar synthetic multiples can be generated using more accurate methods not directly involving ray tracing, e.g., field propagation techniques, but again these require detailed knowledge of at least the ocean bottom, as well as the shape of the subsea interfaces, and so are not as practical as would be desired.

Therefore, a need exists in the art for an improved method for removing the record of multiple surface reflection events from seismic records for seismic data processing purposes.

SUMMARY OF THE INVENTION

Embodiments of the present invention are generally directed to a method for predicting a plurality of surface multiples for a plurality of traces in a record of seismic data. In one embodiment, the method includes providing a plurality of target traces at a nominal offset and a nominal azimuth; selecting a plurality of pairs of input traces, wherein the midpoints of the input traces in each pair are separated by half the nominal offset and the azimuth of a line connecting the midpoints of the input traces in each pair is equal to the nominal azimuth; convolving the selected pairs of input traces to generate a plurality of convolutions; and applying a three dimensional operator to the convolutions.

In another embodiment, the method includes dividing a plurality of target traces into one or more groups according to offsets; dividing each group into one or more subgroups according to azimuths; selecting a first subgroup having a first nominal offset and a first nominal azimuth; selecting a plurality of pairs of input traces, wherein the midpoints of the input traces in each pair are separated by half the first nominal offset and the azimuth of a line connecting the midpoints of the input traces in each pair is equal to the first nominal azimuth; convolving the selected pairs of input traces to generate a plurality of convolutions; and applying a three dimensional operator to the convolutions.

In yet another embodiment, the method includes providing a plurality of target traces at a nominal offset; predicting a plurality of two dimensional surface multiples for a plurality of input subsurface lines; and applying a two dimensional operator to the predicted two dimensional surface multiples.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
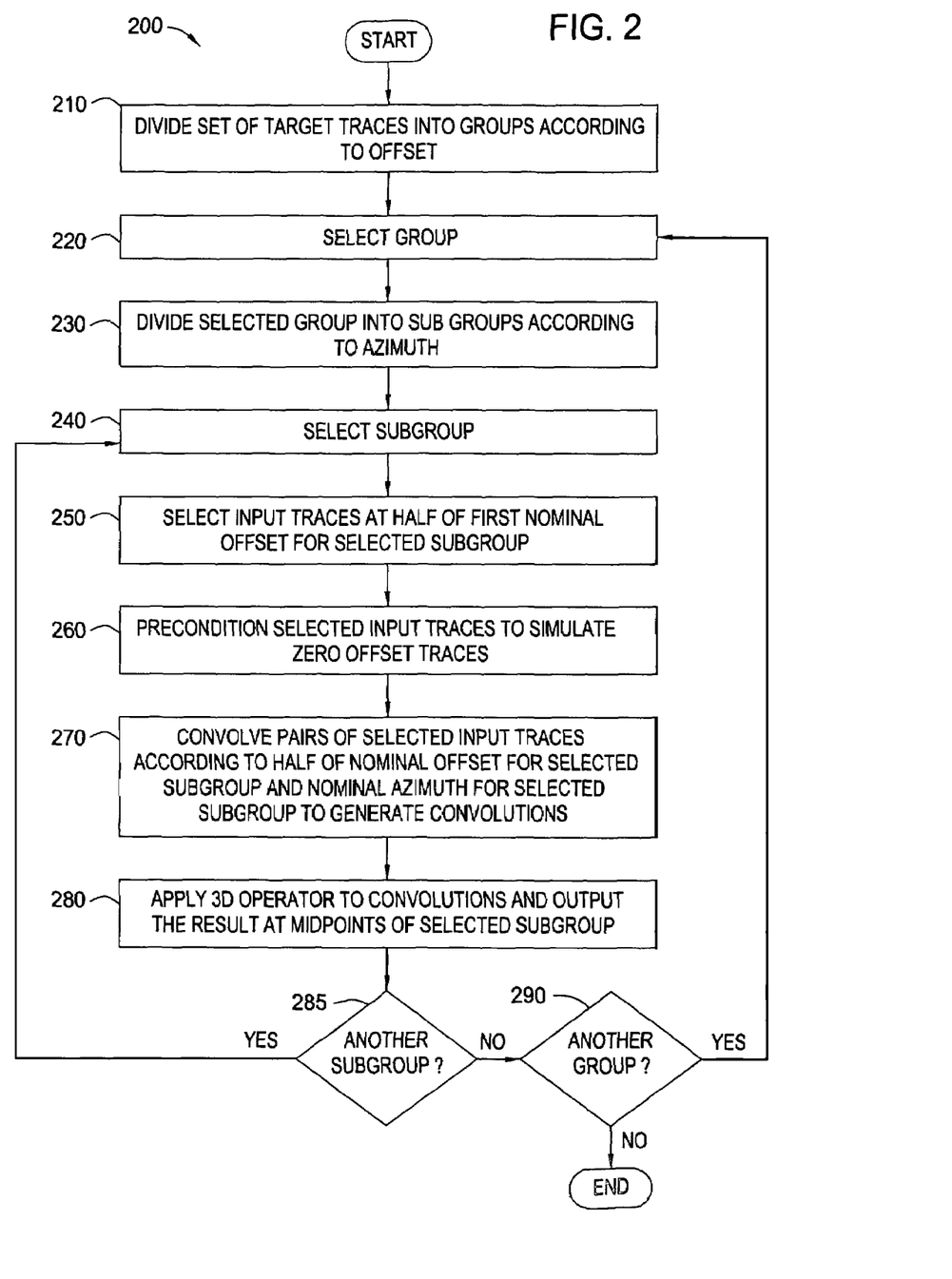
FIG. 2 a flow diagram of a method for performing a three dimensional surface multiple prediction in accordance with one or more embodiments of the invention.

FIG. 2 illustrates a flow diagram of a method 200 for performing a three dimensional surface multiple prediction in accordance with one or more embodiments of the invention. At step 210, a set of target traces is divided into one or more groups according to offsets. Each group contains target traces with offsets within a specified range, where an offset is defined as the horizontal distance between a source and a receiver. The set of target traces defines the locations at which the multiples are to be predicted. The offset ranges span from the shortest offset in the set of target traces, which typically corresponds to the receiver located closest to the back of the vessel, e.g., about 100 meters, to the longest offset in the set of target traces, which typically corresponds to the receiver furthest from the back of the vessel, e.g., about 6000 meters. Each offset range has a nominal offset value, which is typically the central offset value in that range. For example, target traces with offsets between 100 meters and 150 meters may be organized into one range with a nominal offset value of 125 meters, and target traces with offsets between 150 meters and 200 meters may be organized into another range with a nominal offset value of 175 meters.

At step 220, a group, such as a first group, of the target traces with offsets within a first range of offsets is selected. At step 230, the selected group of the target traces is divided into one or more subgroups of target traces according to azimuths. An azimuth is defined as the angle between the line that connects the source and the receiver and some fixed direction, which is typically the in-line direction. Each azimuth range has a nominal value, which is typically the central value of that range. In this manner, all the target traces within a subgroup are at the same or similar azimuths (or have the same nominal azimuth) and the same or similar offsets (or have the same nominal offset). At step 240, a subgroup, such as a first subgroup, of target traces is selected. The first subgroup of target traces is at the first nominal offset and the first nominal azimuth.

At step 250, a set of input traces is selected. The input traces are the traces from which the predicted multiples are computed. In one embodiment, a set of input traces at half of the nominal offset for the selected subgroup of target traces is selected. However, a set of input traces at any offset range may be selected. In another embodiment, the input traces are interpolated and regularized. Alternatively, several offsets may be merged and/or sub-stacked to improve sampling and signal to noise ratio.

At step 260, the selected input traces are preconditioned to simulate zero offset traces. The selected input traces may be preconditioned using many techniques well known in the art, such as a moveout correction, a full migration/demigration and the like. The input traces may be located by their midpoints. In this manner, each preconditioned input trace simulates a trace that would have been recorded with a source and a receiver at the midpoint location.

At step 270, each pair of selected preconditioned input traces is convolved to generate a set of convolutions. The pairs are selected such that the separation between the midpoints of the traces in each pair is equal to half the nominal offset for the selected subgroup of target traces, and the azimuth of the line connecting the midpoints of the traces in each pair is equal to the nominal azimuth of the selected subgroup of target traces. Each convolution may be located at the midpoint of the line connecting the midpoints of the two traces in each pair. The input traces may also be interpolated to form the convolutions. Actual or possible structural dips may also be taken into account in forming the convolutions.

At step 280, a three dimensional operator is applied to the set of convolutions and the result is located at the midpoints of the selected subgroup of target traces. In one embodiment, the three dimensional operator is a three dimensional demigration operator with an offset equal to half of the nominal offset of the selected subgroup of target traces and a velocity equal to half the water velocity. In such a case, the result may be referred to as demigrated convolutions. Another example of the three dimensional operator is a poststack (zero-offset) demigration followed by an inverse Dip Moveout (DMO) and inverse moveout correction. In this manner, the surface multiples for the selected subgroup of target traces may be predicted. In one embodiment, the result may be corrected from the nominal offset and azimuth to the actual offset and azimuth. For instance, the offset correction may be performed using a differential moveout correction, and the azimuth correction may be performed via interpolation from adjacent azimuths.

Alternatively, the input traces may be convolved at their original offset and the convolutions may be corrected prior to applying the three dimensional operator. The correction may be performed using a moveout correction with half the velocity (or twice the offset).

At step 285, a determination is made as to whether another subgroup, such as a second subgroup, of target traces with a second nominal azimuth exists. If the answer is in the affirmative, then processing returns to step 240, at which the second subgroup of target traces is selected. Processing then continues through steps 250-280 at which a set of input traces (which may or may not be the same as the first set) is processed using the nominal azimuth of the second subgroup of target traces in order to predict multiples for those traces. Steps 240-285 continue until all the subgroups within the selected group have been processed.

If the answer is in the negative, then processing continues to step 290, at which a determination is made as to whether another group, such as a second group, of target traces with a second nominal offset exists. If the answer is in the affirmative, then processing returns to step 220, at which the second group of target traces with the second nominal offset is selected. Processing then continues through steps 230-285 at which one or more sets of input traces are processed using the nominal offset for the second group of target traces in order to predict multiples for those traces. Steps 220-290 continue until all the groups within the set of target traces have been processed.

In one embodiment, method 200 may be used to predict the three dimensional surface multiples when substantial streamer (cable) feathering exists. In another embodiment, method 200 may be used to predict multiples at a specified azimuth and may therefore be made to account for azimuth variations in the seismic data. These azimuth variations can be a significant source of error in predicted multiples. As such, in accordance with another embodiment of the invention, method 200 may be used to predict errors in a manner similar to two dimensional and three dimensional surface multiple prediction methods described in U.S. patent application Ser. No. 10/668,927, which is incorporated herein by reference.

Figure 3:
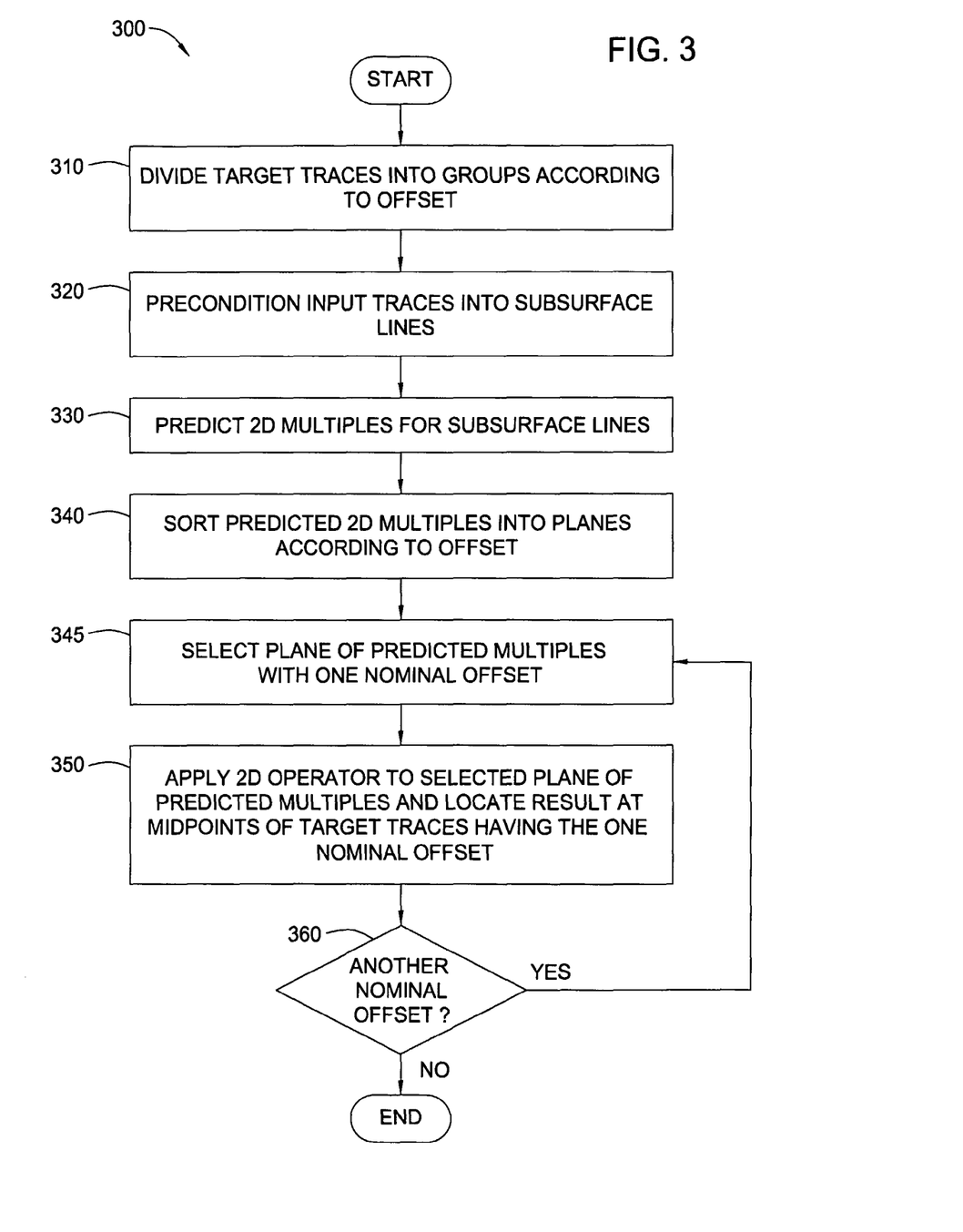
FIG. 3 illustrates a flow diagram of a method for performing a three dimensional surface multiple prediction in accordance with one or more embodiments of the invention.

FIG. 3 illustrates a flow diagram of a method 300 for performing a three dimensional surface multiple prediction in accordance with one or more embodiments of the invention. At step 310, a set of target traces is divided into one or more groups of traces according to offsets. The set of target traces defines the locations at which the multiples are to be predicted. Each group contains target traces with offsets within a specified range. As with the target traces described with reference to step 210, each offset range may have a nominal offset value, which is typically the central offset value in that range.

At step 320, a record of input seismic traces is preconditioned. That is, the record of input seismic traces is separated into input subsurface lines (SSLs) and each input SSL is regularized according to conventional regularization methods known by persons of ordinary skill in the art. Once regularized, the crossline offset between each source and receiver is zero and the inline offset between each source and receiver is regular. Once the record of input seismic traces has been regularized to input SSL's, the regularized traces are extrapolated according to conventional extrapolation methods known by persons of ordinary skill in the art. Once extrapolated, the gap between each source and the receiver nearest to the source on each input SSL is filled with extrapolated receivers. As a result, each input SSL has traces with zero crossline offset and regularly increasing inline offsets starting from zero.

At step 330, the two dimensional surface multiples for each input SSL are predicted using a conventional two dimensional prediction algorithm known by persons of ordinary skill in the art. At step 340, the predicted two dimensional surface multiples are sorted into one or more planes (or groups) according to offsets. Each plane contains multiples within a specified range of offsets. Each offset range may have a nominal offset value, which is typically the central offset value in that range. At step 345, a plane of the predicted two dimensional surface multiples with a nominal offset, such as a first nominal offset, is selected.

At step 350, a two dimensional operator is applied to the plane of predicted two dimensional surface multiples and the result is located at the midpoints of a group of target traces with the first nominal offset. The two dimensional operator may be a two dimensional demigration operator with a velocity equal to half the water velocity or half the primary velocity. In this manner, the two dimensional multiple prediction takes into account variations in the input SSL's in the in line direction and the two dimensional operator takes into account variations in the input SSL's in the cross line direction.

At step 360, a determination is made as to whether a plane of predicted two dimensional surface multiples at a second nominal offset exists. If the answer is in the affirmative, then processing returns to step 345, at which a plane of predicted two dimensional surface multiples at a second nominal offset is selected. Processing then continues to step 350, at which a two dimensional operator is applied to the plane of predicted two dimensional surface multiples at the second nominal offset and the result is located at the midpoints of a group of target traces at the second nominal offset. Steps 345-360 continue until all of the predicted two dimensional surface multiples at various nominal offsets have been processed. In one embodiment, method 300 may be used to predict the three dimensional surface multiples when the streamers (or cables) are all substantially parallel with each other with negligible feathering.

Figure 4:
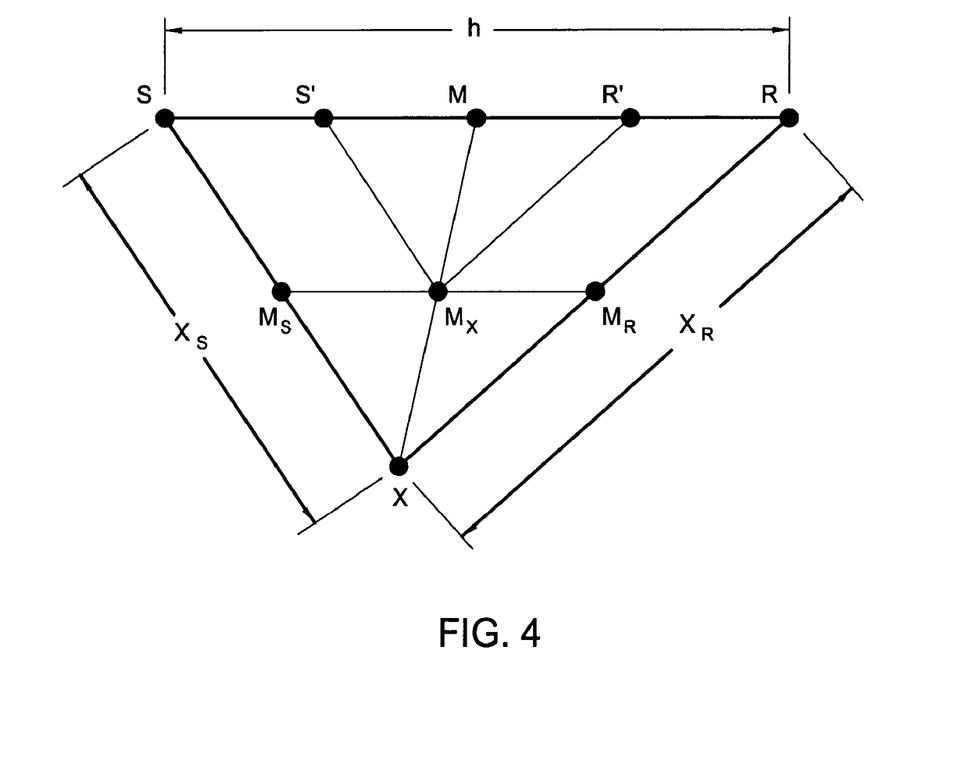
FIG. 4 illustrates a plan view of an acquisition geometry in accordance with one or more embodiments of the invention.

The following paragraphs provide mathematical derivations for methods 200 and 300 in accordance with one or more embodiments of the invention. FIG. 4 illustrates a plan view of an acquisition geometry in accordance with one or more embodiments of the invention. Surface multiples for a trace (S, R), with source at S and receiver at R, are to be predicted. M and h are defined as the midpoint and offset of (S, R) respectively. X is defined as a potential downward reflection point (DRP) for the surface multiples.

A three dimensional surface multiple prediction may be performed by convolving trace (S, X) with trace (X, R), and summing these convolutions over all possible X. In order to do this, traces (S, X) and (X, R) generally need to be estimated from recorded traces. One way to estimate trace (S, X) is to apply a differential moveout correction to a trace with a similar midpoint, $M_S$, from the recorded dataset and with a similar offset. Trace (X, R) may be estimated in like manner. The differential moveout applied to the trace used to estimate (S, X) depends not only on its offset, but also on the offset from S to X, denoted $x_S$ in FIG. 4. Typically, a given recorded trace will only be used to estimate one trace for each subsurface line (SSL) in the prediction process, but it will be used on every SSL within a given aperture of the recorded trace. As such, the differential moveout correction and convolution may be repeated for every SSL for which the prediction is required.

The order of the moveout correction and the convolution may be swapped, i.e. traces with midpoints at $M_S$ and $M_R$ are convolved before the moveout correction is applied, and the resultant error may be corrected after the convolution. The recorded traces may be processed to approximate (kinematically) zero-offset traces at the midpoint locations. For a simple, first-order multiple from a horizontal reflector at time $t_0$ in a constant velocity medium with velocity v, the primary reflections occur at time $t_0$ on the zero-offset traces at $M_S$ and $M_R$, and at time $2t_0$ on their convolution. The travel time for the primary reflection on trace (S, X) is given by:

$$t(S, X) = [t_0^2 + (x_S/v)^2]^{1/2} \quad (1)$$

and similarly for the trace (X, R), such that the travel time on the convolution of these traces is given by $$t(X) = [t_0^2 + (x_S/v)^2]^{1/2} + [t_0^2 + (x_R/v)^2]^{1/2} \quad (2)$$

Accordingly, a post-convolution correction is performed to map an event at time $2t_0$ to time $t(X)$. At this point, a constant velocity demigration operator with velocity V maps a migrated time $t_m$ to a demigrated time $t_d$ given by:

$$t_d = [(t_m/2)^2 + (X_S/V)^2]^{1/2} + [(t_m/2)^2 + (X_R/V)^2]^{1/2} \quad (3)$$

where $X_S$ and $X_R$ are the distances from the migrated location to the demigrated source and receiver locations, respectively. Equation (3) has a similar form to the post-convolution correction. Thus, if $t_m = 2t_0$ and $t_d = t(X)$, then equation (3) becomes $$t(X) = [t_0^2 + (X_S/V)^2]^{1/2} + [t_0^2 + (X_R/V)^2]^{1/2} \quad (4)$$

Equation (4) would be identical to the post-convolution correction if the convolved trace is located at X, and $X_S = x_S$, $X_R = x_R$ and V=v. However, the location X depends on S and R, and hence the demigration would be repeated whenever a change in (S, R) creates a change in X. The convolved trace may be located at the "migrated location" $M_X$, the midpoint of $M_S$ and $M_R$, which does not depend on S or R, but only on $M_S$ and $M_R$. If S' and R' are defined to be the midpoints of (S, M) and (M, R) respectively, then the distances from $M_X$ to S' and R' are $x_S/2$ and $x_R/2$ respectively. Hence, demigration from $M_X$ to (S',R') yields a demigrated traveltime given by equation (3) with $X_S = x_S/2$ and $X_R = x_R/2$, which provides the desired demigrated traveltime if velocity V=v/2.

Notably, $(M_S, M_R)$ is parallel to (S, R) and the offset from $M_S$ to $M_R$ is h/2. Accordingly, if the offset and azimuth of (S, R) are fixed, then the offset and azimuth of $(M_S, M_R)$ are also known. If $M_X$ is determined and a volume of data that has been kinematically mapped to zero offset is available, then $M_S$ and $M_R$ may be determined, and the corresponding traces may be convolved from this volume, thereby placing the convolution into a new volume at location $M_X$. Repeating this operation for all $M_X$, and then demigrating the volume at constant offset (h/2) and azimuth (as defined previously) with velocity v/2 yields the predicted multiples for the entire offset plane.

One distinction between the embodiments of the invention and the prior art is that the traces are convolved at fixed (often zero) offset before the offset is corrected. The improved performance accomplished by various embodiments of the invention is attained by making some approximations in the derivation of the algorithm. Theory and tests have shown that, in many cases, the predicted multiples are still sufficiently accurate that they may be adaptively subtracted. When crossline dip effects are significant, multiples predicted using various embodiments of the invention will be much more accurate than those predicted by a two dimensional surface multiple algorithm.

Figure 5:
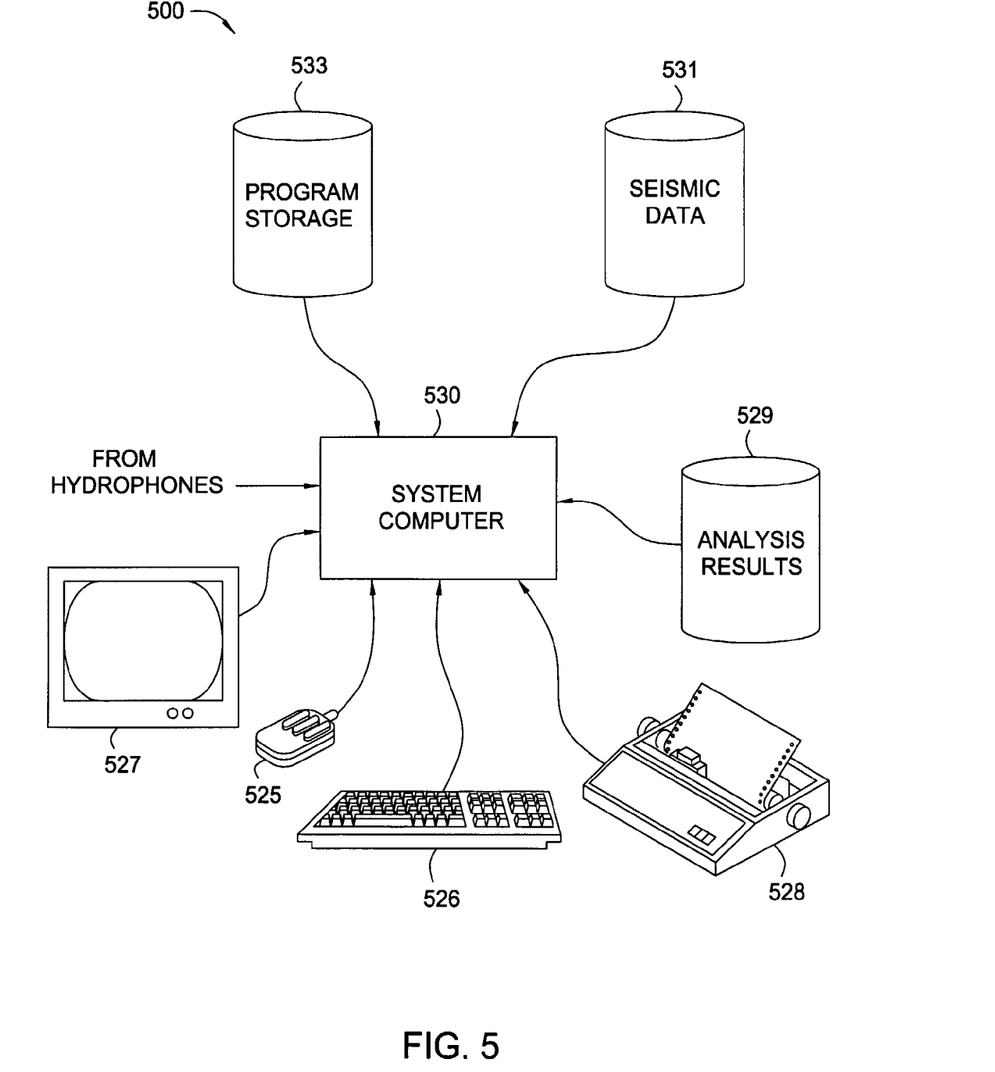
FIG. 5 illustrates a computer network into which various embodiments of the invention may be implemented.

FIG. 5 illustrates a computer network 500, into which embodiments of the invention may be implemented. The computer network 500 includes a system computer 530, which may be implemented as any conventional personal computer or workstation, such as a UNIX-based workstation. The system computer 530 is in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one embodiment, seismic data from hydrophones are stored in disk storage device 531. The system computer 530 may retrieve the appropriate data from the disk storage device 531 to perform the 3-D surface multiple prediction according to program instructions that correspond to the methods described herein. The program instructions may be written in a computer programming language, such as C++, Java and the like. The program instructions may be stored in a computer-readable memory, such as program disk storage device 533. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 530 presents output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 is in communication with hydrophones (either directly or via a recording unit, not shown), to receive signals indicative of the reflected seismic energy. These signals, after conventional formatting and other initial processing, are stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for predicting a plurality of surface multiples for a plurality of traces in a record of seismic data, comprising:
   providing a plurality of target traces at a nominal offset and a nominal azimuth;
   selecting a plurality of pairs of input traces, wherein the midpoints of the input traces in each pair are separated by half the nominal offset and the azimuth of a line connecting the midpoints of the input traces in each pair is equal to the nominal azimuth;
   convolving the selected pairs of input traces to generate a plurality of convolutions; and
   applying a three dimensional operator to the convolutions, wherein the three dimensional operator is a three dimensional demigration operator having an offset equal to half the nominal offset and a velocity equal to one of half the water velocity or half of a multiple velocity function.

2. The method of claim 1, further comprising preconditioning the input traces to simulate zero offset traces.

3. The method of claim 1, further comprising preconditioning the input traces to simulate zero offset traces by a moveout correction.

4. The method of claim 1, wherein the target traces provide the locations at which the surface multiples are predicted.

5. The method of claim 1, wherein the nominal offset is a central offset value within a range of offsets.

6. The method of claim 1, wherein the nominal azimuth is a central azimuth value within a range of azimuths.

7. The method of claim 1, wherein selecting the pairs of input traces comprises selecting the input traces at half the nominal offset.

8. The method of claim 1, further comprising interpolating and regularizing the input traces.

9. The method of claim 1, further comprising locating each convolution at the midpoint of the line connecting the midpoints of the input traces in each pair.

10. The method of claim 1, wherein applying the three dimensional operator to the convolutions comprises locating the result of the three dimensional operator application at the midpoints of the target traces.

11. The method of claim 10, further comprising correcting the result to an actual offset and an actual azimuth.

12. A method for predicting a plurality of surface multiples for a plurality of traces in a record of seismic data, comprising:
   dividing a plurality of target traces into one or more groups according to offsets;
   dividing each group into one or more subgroups according to azimuths;
   selecting a first subgroup having a first nominal offset and a first nominal azimuth;
   selecting a plurality of pairs of input traces, wherein the midpoints of the input traces in each pair are separated by half the first nominal offset and the azimuth of a line connecting the midpoints of the input traces in each pair is equal to the first nominal azimuth;
   convolving the selected pairs of input traces to generate a plurality of convolutions; and
   applying a three dimensional operator to the convolutions, wherein the three dimensional operator is a three dimensional demigration operator having an offset equal to half the first nominal offset and a velocity equal to one of half the water velocity or half of a multiple velocity function.

13. The method of claim 12, wherein the target traces within each group are at a nominal offset.

14. The method of claim 13, wherein the nominal offset is a central offset value within a range of offsets.

15. The method of claim 12, wherein the target traces within each subgroup are at a nominal offset and a nominal azimuth.

16. The method of claim 14, wherein the nominal azimuth is a central azimuth value within a range of azimuths.

17. The method of claim 12, further comprising preconditioning the input traces to simulate zero offset traces.

18. The method of claim 12, further comprising locating each convolution at the midpoint of the line connecting the midpoints of the input traces in each pair.

19. The method of claim 12, wherein applying the three dimensional operator to the convolutions comprises locating the result of the three dimensional operator application at the midpoints of the target traces.

20. A method for predicting a plurality of surface multiples for a plurality of traces in a record of seismic data, comprising:
   providing a plurality of target traces at a nominal offset and a nominal azimuth;
   selecting a plurality of pairs of input traces, wherein the midpoints of the input traces in each pair are separated by half the nominal offset and the azimuth of a line connecting the midpoints of the input traces in each pair is equal to the nominal azimuth;
   convolving the selected pairs of input traces to generate a plurality of convolutions; and
   applying a three dimensional operator to the convolutions, wherein the three dimensional operator is a poststack (zero-offset) demigration.

21. The method of claim 20, wherein applying the three dimensional operator comprises applying a dip moveout (DMO) and inverse moveout correction.

22. A method for predicting a plurality of surface multiples for a plurality of traces in a record of seismic data, comprising:

dividing a plurality of target traces into one or more groups according to offsets;
dividing each group into one or more subgroups according to azimuths;
selecting a first subgroup having a first nominal offset and a first nominal azimuth;
selecting a plurality of pairs of input traces, wherein the midpoints of the input traces in each pair are separated by half the first nominal offset and the azimuth of a line connecting the midpoints of the input traces in each pair is equal to the first nominal azimuth;

convolving the selected pairs of input traces to generate a plurality of convolutions; and
applying a three dimensional operator to the convolutions, wherein the three dimensional operator is a poststack (zero-offset) demigration.

23. The method of claim 22, wherein applying the three dimensional operator comprises applying a dip moveout (DMO) and inverse moveout correction.

* * * * *